No. 861,828. PATENTED JULY 30, 1907.
J. GRINDROD & A. W. GILFILLAN.
PIPE COUPLING.
APPLICATION FILED MAR. 8, 1906.
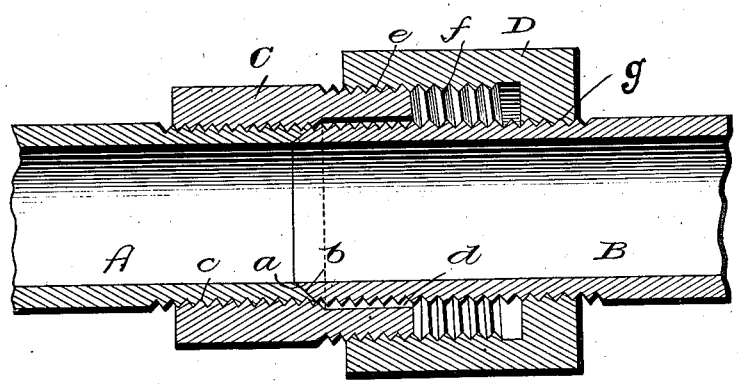
Witnesses
T. L. M_____
R. C. Braddock.
Inventors
John Grindrod
and Adam W. Gilfillan
By William W. Dyane.
Their Attorney.

UNITED STATES PATENT OFFICE.

JOHN GRINDROD AND ADAM W. GILFILLAN, OF BAKERSFIELD, CALIFORNIA.

PIPE-COUPLING.

No. 861,828.   Specification of Letters Patent.   Patented July 30, 1907.

Application filed March 8, 1906. Serial No. 304,964.

*To all whom it may concern:*

Be it known that we, JOHN GRINDROD and ADAM W. GILFILLAN, citizens of the United States, residing at Bakersfield, in the county of Kern and State of California, have invented certain new and useful Improvements in Pipe-Couplings, of which the following is a specification.

Our invention has reference to pipe couplings; and it contemplates the provision of a coupling in which a splice or joint is made by the adjoining ends of sections of pipe, thus avoiding dependence on threads which are frequently imperfect, and the splice or joint may be made very tight without resort to the use of packing of any kind, without distorting and weakening the coupling by screwing the same unduly tight, and without diminishing the bore of the conduit or offering any obstruction whatsoever in the same.

With the foregoing object in view, the invention consists in the peculiar and advantageous construction hereinafter described and particularly pointed out in the claims appended.

In the accompanying drawing, forming part of this specification, the figure represents a longitudinal section of a pipe coupling constituting the preferred embodiment of our invention.

Referring by letters to the drawing which shows a coupling for use in high pressure systems and having but one splice or joint instead of three as in ordinary high-pressure couplings:

A and B are sections of pipe, exteriorly threaded in the usual manner and having their adjoining ends beveled as indicated by $a$ and $b$ so as to mate and make a tight splice or joint.

C is a male coupling member, and D is a complementary female coupling member. The male coupling member C is in the form of a sleeve, and is provided at one end with an interior thread $c$ corresponding to the ordinary exterior thread of the pipe section A; it being understood of course that the pipe section A and the interiorly threaded part $c$ of the coupling member C may be of any desired diameter. At its opposite end, with reference to the interiorly threaded end $c$, the interior of the member C is plain, as indicated by $d$, in order to permit the threaded part of pipe section B to freely pass through it and meet and mate with the end of the pipe section A so as to form the splice or joint. On the outer side of its inner portion the said member C is provided with a thread $e$ which may have the same pitch as the pipe thread or any other pitch desired but is a left hand thread for a purpose which will presently appear. The female coupling member D is also made in the form of a sleeve sufficiently large to receive the male member C, and is provided at its inner end with an interior left hand thread $f$ designed to coöperate with the left hand thread $e$ of member C in drawing the ends of the pipe sections together so as to form a tight splice or joint, and is also provided at its outer end portion with an interior thread $g$ of the ordinary pipe type designed to engage thread on the pipe section B.

In making the coupling described, the end of pipe section A is turned into the male coupling member C and the end of pipe section B is inserted in the plain bore of said coupling member until the ends of said pipe sections are adjacent to each other; the female coupling member D being screwed back on pipe section B to such an extent that when its left hand thread $f$ is screwed up on the corresponding thread $e$ of member C it also carries said pipe section B and by so doing brings the adjoining ends of the pipe sections A and B together and expands said ends tight against the inner wall of coupling member C so as to assure the production of a tight splice or joint.

It will be gathered from the foregoing that the coupling shown in the drawing has but one splice or joint, and yet is absolutely tight and does not entail the employment of packing of any kind. It will also be gathered that the splice or joint reinforced by the coupling members is stronger than any other part of the conduit; that dependence does not have to be placed on the correct fit of threads in order to assure the production of a tight splice or joint; and that the coupling does not have to be screwed so tight as to distort the same. This latter will be appreciated as an important advantage when it is remembered that in high-pressure pipe lines the couplings have to withstand an internal pressure of from five hundred to a thousand pounds to the square inch, and it is, therefore, not well to distort and weaken the couplings in securing tight joints.

Having described our invention, what we claim and desire to secure by Letters Patent is:

1. The combination in a pipe coupling, of a male coupling member interiorly threaded at one end and having a plain bore at its opposite end and also having an exterior, left hand thread on the latter end, exteriorly threaded pipe sections having beveled ends mated in the male coupling member at the inner end of the plain bore thereof, and a female coupling member surrounding and having an interior thread engaging one pipe section and also having an interior left hand thread engaging the exterior, left hand thread of the male coupling member.

2. The combination in a pipe coupling, of a male coupling member interiorly threaded at one end and having a plain bore at its opposite end and also having an exterior left hand thread on the latter end, exteriorly threaded pipe sections the ends of which are brought together in the male coupling member at the inner end of the plain bore thereof, and a female coupling member surrounding and having an interior thread engaging one pipe section and also having an interior left hand thread engaging the exterior left hand thread of the male coupling member.

3. The combination in a pipe coupling, of exteriorly threaded pipe sections the ends of which abut against each other, an interiorly and exteriorly threaded coupling member having at one end a plain bore and surrounding the meeting ends of the pipe sections and engaging the exterior thread of one pipe section, and a female coupling member having an interior thread engaging the exterior thread of the other pipe section and also having another interior thread engaging the exterior thread of the male coupling member.

In testimony whereof we affix our signatures in presence of two witnesses.

JOHN GRINDROD.
ADAM W. GILFILLAN.

Witnesses:
W. S. ALLEN,
M. L. BUTTZ.